Patented May 16, 1939

2,158,154

UNITED STATES PATENT OFFICE 2,158,154

CATALYST

James R. Rose, Edgeworth, Pa.

No Drawing. Application November 22, 1937,
Serial No. 175,885

3 Claims. (Cl. 23—233)

This invention relates to a catalyst which has been found to be particularly advantageous in the treatment of gases resulting from the refining of crude oil for the purpose of obtaining therefrom hydrocarbon liquid polymers suitable for motor fuel.

As is well known, the different oil fields produce crude oils that differ quite widely in their content of saturates and unsaturates, with a resultant variation in the content of the gases resulting from the refining of such crudes. It is particularly important, in the treatment of these gases for the purpose of obtaining liquid hydrocarbon polymers such as referred to, to be able to employ therewith a catalyst which is capable of operating efficiently on all such gases.

The catalyst described herein accomplishes this result in a most effective manner. It comprises a mixture of natural phosphate rock, zinc phosphate, a halide of barium, and carnotite, in the following proportions by weight:

| | Parts by weight |
|---|---|
| Natural phosphate rock | 20 to 100 |
| Carnotite ore | 20 to 100 |
| Zinc phosphate | 5 to 20 |
| Barium halide | 3 to 12 |

While the proportions set forth have been found to give quite satisfactory results in the treatment of the aforesaid gases, I have obtained the best results by a mixture of the ingredients in the following proportions by weight:

| | Parts by weight |
|---|---|
| Natural phosphate rock | 40 |
| Carnotite ore | 40 |
| Zinc phosphate | 10 |
| Barium halide | 6 |

(The halide of barium which I prefer to use is the chloride.)

I have found that the mixture of the foregoing ingredients produces a catalyst of extraordinary strength and vitality. The barium-chloride functions as a stimulant in the mixture, while the carnotite, being radioactive, also invigorates the other ingredients and, in conjunction therewith, operates most efficiently in breaking up both the saturates and the unsaturates, with the production therefrom of the desired hydrocarbon liquid polymers.

In making the foregoing mixture, I prefer to use the run of the crush of the carnotite, wherein the largest particles are about the size of a hickory nut. I also prefer to use phosphate rock in the form of lumps of about the same size as the lumps of carnotite. The zinc phosphate is used in powdered form and the barium chloride in its crystalline form, the particles of the latter being about the size of coarse salt. The foregoing ingredients are mixed in a dry state.

My catalyst is practically indestructible and will last from five to ten times as long, without reactivation, as will the ordinary catalysts used in the art. This is due to the fact that the radioactivity of carnotite is not affected by heat. Where other catalysts are used in this art, it is necessary to reactivate the same from time to time, which involves the shutting down of the furnaces in which they are employed and/or the renewal of the catalysts employed therein.

Having thus described my invention, what I claim is:

1. A catalyst suitable for use in the conversion of crude-oil refinery gases containing saturates and unsaturates into hydrocarbon liquid polymers, said catalyst comprising a mixture of the following ingredients in substantially the following proportions by weight:

| | Parts by weight |
|---|---|
| Natural phosphate rock | 20 to 100 |
| Carnotite ore | 20 to 100 |
| Zinc phosphate | 5 to 20 |
| Barium halide | 3 to 12 |

2. A catalyst suitable for use in the conversion of crude-oil refinery gases containing saturates and unsaturates into hydrocarbon liquid polymers, said catalyst comprising a mixture of the following ingredients in substantially the following proportions by weight:

| | Parts by weight |
|---|---|
| Natural phosphate rock | 40 |
| Carnotite ore | 40 |
| Zinc phosphate | 10 |
| Barium halide | 6 |

3. A catalyst suitable for use in the conversion of crude-oil refinery gases containing saturates and unsaturates into hydrocarbon liquid polymers, said catalyst comprising a mixture of the following ingredients in substantially the following proportions by weight:

| | Parts by weight |
|---|---|
| Natural phosphate rock | 40 |
| Carnotite ore | 40 |
| Zinc phosphate | 10 |
| Barium chloride | 6 |

JAMES R. ROSE.